United States Patent [19]

Kruckemeyer et al.

[11] Patent Number: 5,207,301
[45] Date of Patent: May 4, 1993

[54] ACTIVE SUSPENSION ACTUATOR WITH REAL TIME DAMPING

[75] Inventors: William C. Kruckemeyer; Michael L. Oliver, both of Xenia; James L. Lopez, Jr., Dayton, all of Ohio

[73] Assignee: General Motors Corporation, Detroit, Mich.

[21] Appl. No.: 748,593

[22] Filed: Aug. 22, 1991

[51] Int. Cl.$^5$ ............................................. F16F 9/46
[52] U.S. Cl. ................................... 188/299; 188/318; 188/322.21; 267/64.26
[58] Field of Search ............... 188/299, 279, 282, 285, 188/286, 314, 315, 318, 322.13, 322.14, 322.19, 322.21, 322.22; 267/64.25, 64.26, 64.16; 280/707

[56] References Cited

U.S. PATENT DOCUMENTS

| | | | |
|---|---|---|---|
| 2,857,157 | 10/1958 | Bonquet | 267/64.26 X |
| 3,011,777 | 12/1961 | Stout | 267/64.26 |
| 4,828,229 | 5/1989 | Fannin et al. | 267/64.25 |
| 4,828,230 | 5/1989 | Steger et al. | 267/64.16 |
| 4,863,147 | 9/1989 | Loeber et al. | 267/64.26 |
| 4,902,034 | 2/1990 | Maguran et al. | 280/707 |
| 4,973,854 | 11/1990 | Hummel | 267/64.26 |
| 5,024,460 | 6/1991 | Hanson et al. | 280/707 |
| 5,031,732 | 6/1991 | Batek et al. | 267/64.26 X |

Primary Examiner—Robert J. Oberleitner
Assistant Examiner—Lee W. Young
Attorney, Agent, or Firm—A. Michael Tucker

[57] ABSTRACT

A piston and rod subassembly is reciprocally mounted in a piston tube subassembly. A transfer tube is concentrically mounted in the rod and is in fluid communication with a pressurized source of fluid. A solenoid valve subassembly provides real time damping of relatively high frequency inputs by opening and closing a bypass channel formed in the actuator. Relatively low frequency inputs are actively controlled as fluid passes to and from the pressurized source of fluid. An outer body tube includes a fluid trapping chamber to prevent leakage from the actuator.

9 Claims, 3 Drawing Sheets

ACTIVE SUSPENSION ACTUATOR WITH REAL TIME DAMPING

FIELD OF THE INVENTION

The present invention relates generally to an active suspension system for a vehicle. In particular, the present invention is concerned with an electrically controlled hydraulic actuator used to mount a vehicle road wheel assembly. The actuator actively controls the plane of the vehicle and concurrently provides real time damping of the wheel assembly.

DESCRIPTION OF THE RELATED ART

Electrically controlled hydraulic dampers (shock absorbers and struts) for vehicular suspension systems are well-known. Many controllable shock absorbers utilize an electric solenoid or motor-driven member to select different damping characteristics. Various designs have been disclosed which provided real time damping of a wheel assembly.

Hydraulic actuators for active ride control are utilized to control the body attitude of a vehicle. In many systems, an electric controller sends fluid to or receives fluid from a pressurized actuator to resist compression and perform rebound.

The art continues to seek improvements. It is desirable to provide a hydraulic actuator for active control of body attitude simultaneously with real time damping of a wheel assembly.

SUMMARY OF THE INVENTION

The present invention includes a hydraulic actuator for an active ride suspension system. The actuator is designed for use with a pressurized fluid source, e.g., an accumulator, to control body attitude. Additionally, the present actuator includes a solenoid valve subassembly for providing real time damping of inputs from a wheel assembly. Furthermore, this invention includes an outer enveloping design to prevent leakage of hydraulic fluid. The present design is suitable for use on passenger and commercial vehicles.

In a preferred embodiment, the present actuator includes a piston and rod subassembly reciprocally mounted in a piston tube subassembly. A transfer tube is concentrically mounted in the rod and is in fluid communication with a pressurized source of fluid. A solenoid valve subassembly provides real time damping of relatively high frequency inputs by opening and closing a bypass channel formed in the actuator. Relatively low frequency inputs are actively controlled as fluid passes to and from the pressurized source of fluid. An outer body tube includes a fluid trapping chamber to prevent leakage from the actuator.

DETAILED DESCRIPTION OF THE PREFERRED EMBODIMENT

Figure 1A:
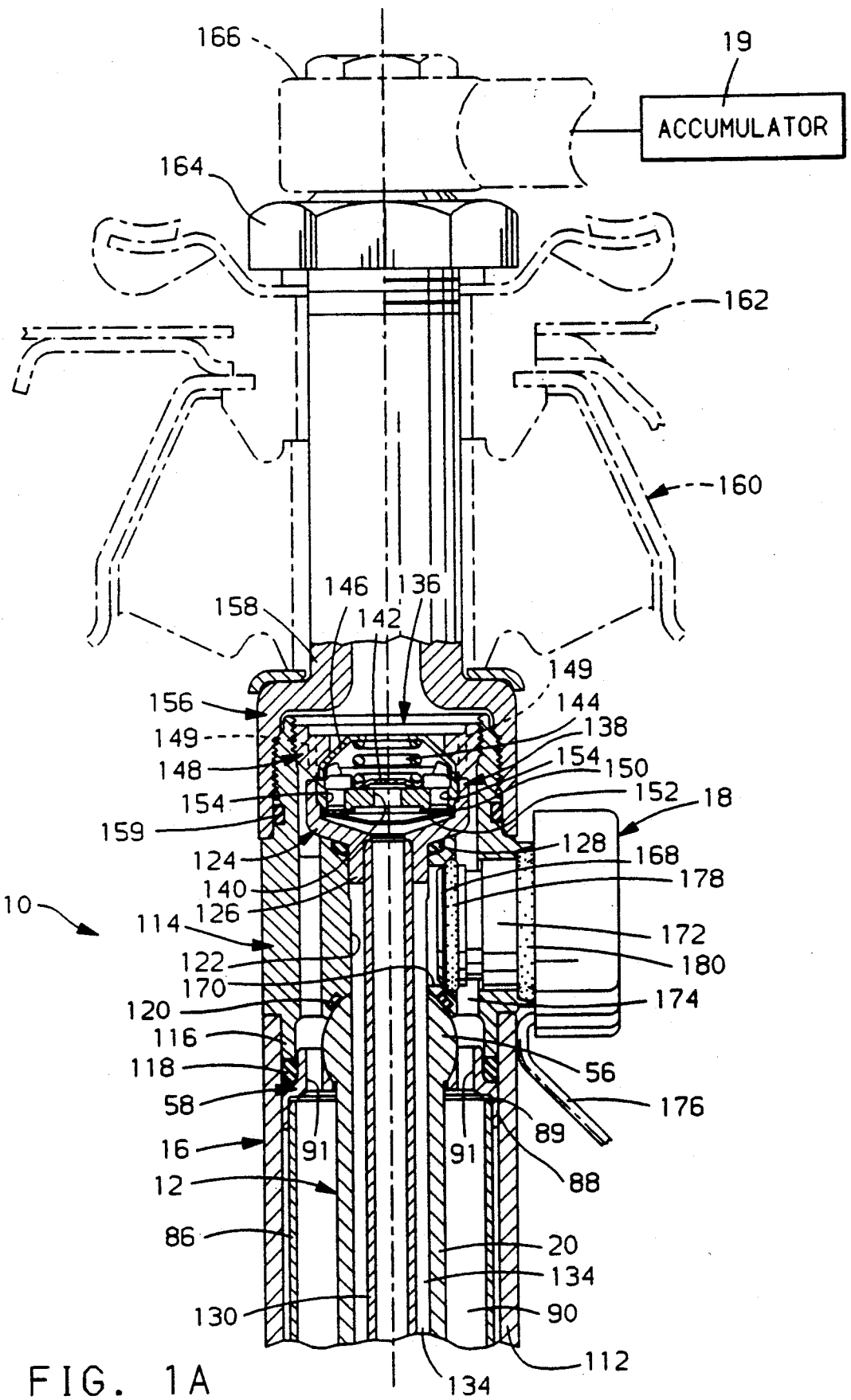
FIGS. 1A and 1B are a longitudinal sectional view of a preferred embodiment of the present hydraulic actuator mounted between a schematically illustrated vehicle body and a partially illustrated suspension control arm.
Figure 1B:
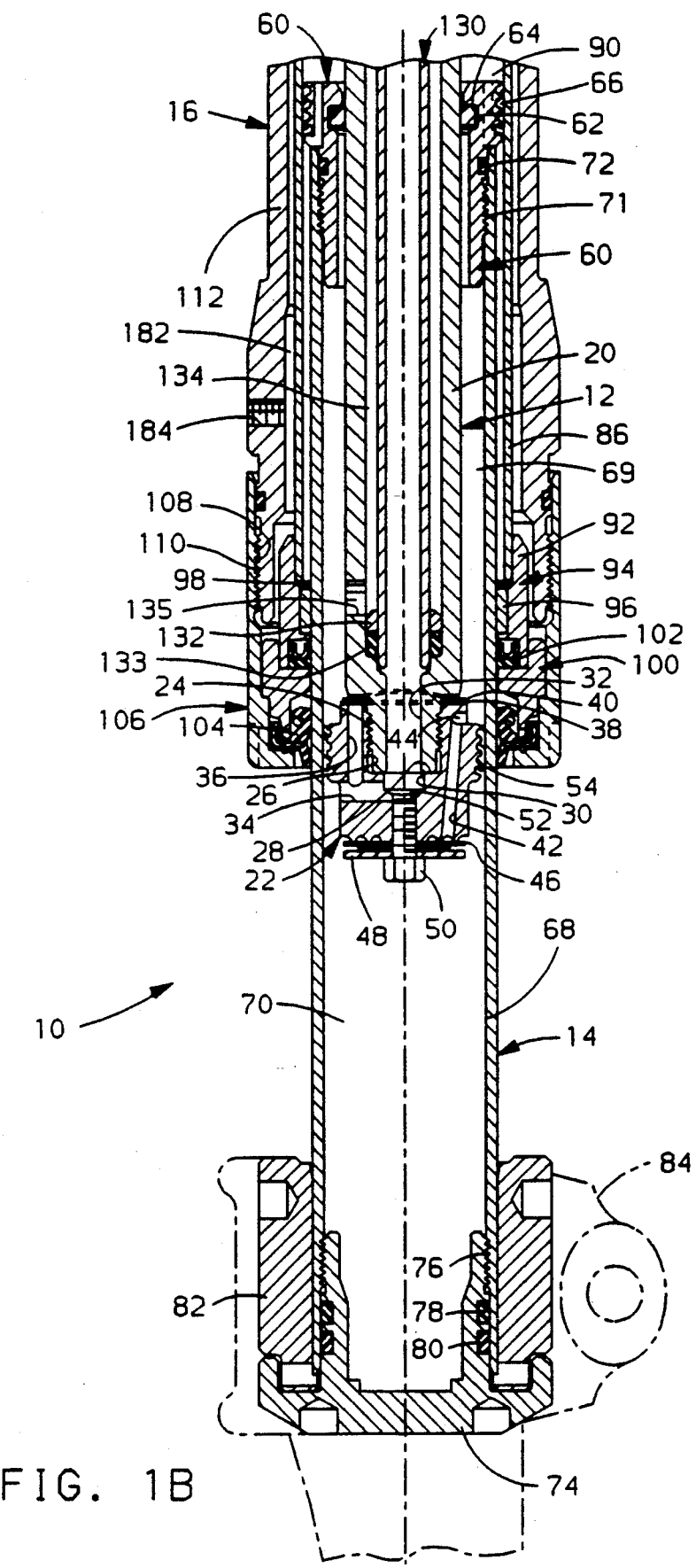

A hydraulic actuator is indicated generally at 10 in FIGS. 1A and 1B. The actuator 10 is an assembly including a piston and rod subassembly 12, a piston tube subassembly 14, a body subassembly 16 and a solenoid valve subassembly 18. The actuator 10 is designed for use in a vehicular suspension system and is supplied with hydraulic fluid from a pressurized source, e.g., a hydraulic accumulator 19.

Figure 2:
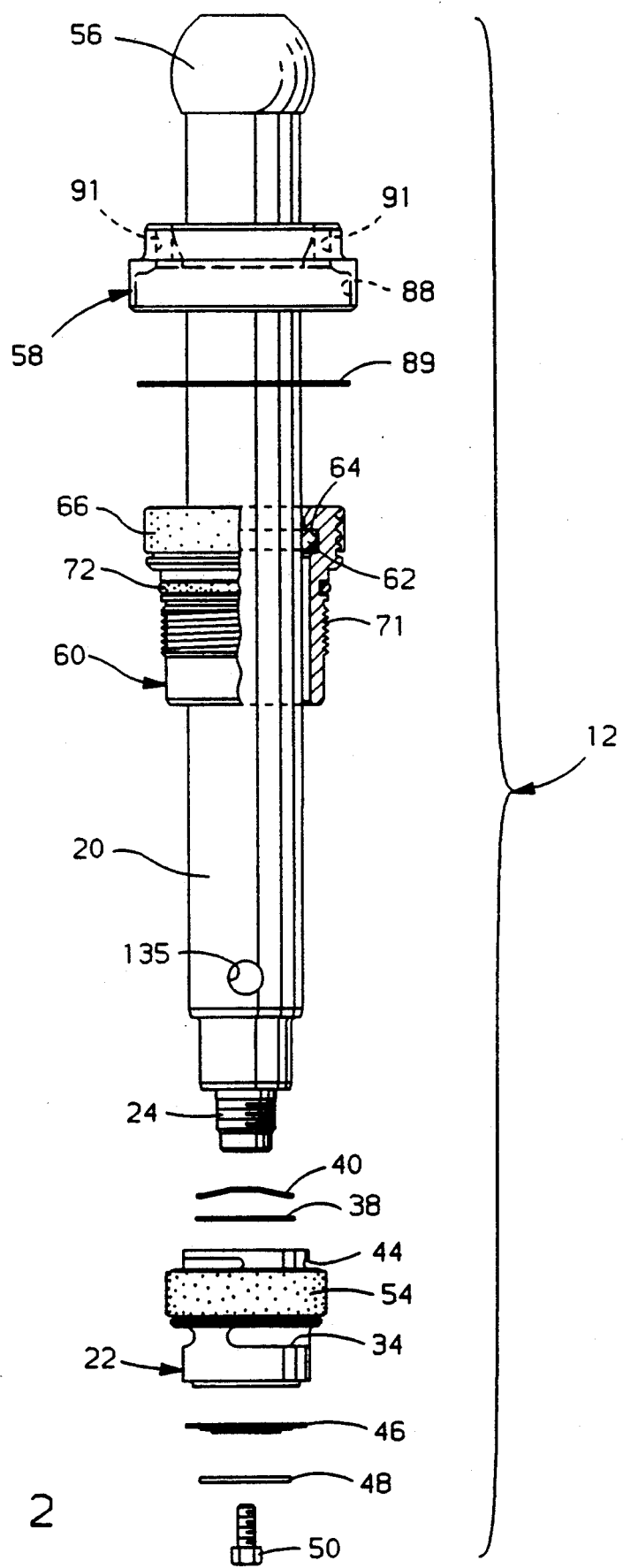
FIG. 2 is an exploded elevational view of a piston and rod subassembly removed from the actuator of FIG. 1 for purposes of clarity of illustration.

The piston and rod subassembly 12, removed from the actuator 10 for purposes of clarity of illustration in FIG. 2, includes a hollow piston rod 20 having a damping piston 22 mounted to an externally threaded neck 24 at the lower end of the piston rod 20. The damping piston 22 is a generally cylindrical member having a stepped central bore. A large diameter portion 26 (FIG. 1B) of the central bore includes internal threads for receiving the threaded neck 24 of the piston rod 20. An annular seat 28 is formed at the intersection of the large diameter portion 26 with an intermediate diameter portion 30 of the central bore. A lower end surface of the piston rod 20 rests on the seat 28 when the damping piston 22 is threaded to the piston rod 20. A central passage 32 in the neck 24 provides a fluid path between the interior of the hollow piston rod 20 and the intermediate diameter portion 30 of the central bore. A transfer port 34 is formed as a slot or groove on an outer circumference of the damping piston 22 terminating in a radial channel to provide a fluid path from the intermediate diameter portion 30 to an area surrounding the damping piston 22.

A compression control channel 36 is formed in the damping piston 22 between the transfer port 34 and an upper end surface of the damping piston 22. An intake valve disc 38 and associated intake valve spring 40 are concentrically mounted about the neck 24 of the piston rod 20 and control fluid flow through the compression control channel 36 as described below.

A rebound control channel 42 is formed in the damping piston 22 between an upper undercut 44 to a lower end surface of the damping piston 22. A plurality of deflectable discs 46 is seated on annular seats provided on the lower end surface of the damping piston 22. A retainer 48 and cap screw 50 secure the deflectable discs in place as the cap screw 50 is threaded into internal threads provided in a small diameter portion 52 of the stepped central bore of the damping piston 22. A sealing band 54 formed from low friction material is provided around the outer circumference of the damping piston 22.

The piston rod 20 extends upwardly from the damping piston 22 and terminates in a ball end 56 which is formed by any suitable means. A ball retainer 58 is concentrically mounted on the piston rod 20 and forms a ball and socket joint with the ball end 56.

A generally cylindrical and hollow intermediate piston 60 is concentrically mounted about the piston rod 20 between the ball retainer 58 and the damping piston 22. A seal ring 62 formed from a low friction material is received in an internal groove 64 provided in an inner surface of the intermediate piston 60 to provide a fluid seal between the piston rod 20 and the intermediate piston 60. A sealing band 66 formed from a low friction material is provided around the upper portion of the outer circumference of the intermediate piston 60.

The piston and rod subassembly 12 is reciprocally mounted in the piston tube assembly 14. The damping piston 22 is slidably mounted in a piston tube 68 of the piston tube assembly 14 and divides the interior of the piston tube 68 into an upper chamber 69 and a lower chamber 70. External threads 71 on the intermediate piston 60 mate with internal threads provided adjacent the upper end of a piston tube 68. A sealing ring 72 is provided between the intermediate piston 60 and the piston tube 68 to provide a fluid seal.

The lower end of the piston tube 68 is closed by an end cap 74 threaded to internal threads 76 provided in the inner surface of the piston tube 68. A pair of sealing rings 78,80 are mounted between the piston tube 68 and the end cap 74 to provide a fluid seal. An end collar 82 is concentrically mounted on the piston tube 68 and retained by the end cap 74 to provide connection of the piston tube assembly 14 to a control arm 84 and a wheel assembly (not illustrated).

The piston tube subassembly 14 containing the upwardly projecting piston and rod subassembly 12 is reciprocally mounted in the body subassembly 16. The intermediate piston 60 is reciprocally mounted in an intermediate tube 86. The upper end of the intermediate tube 86 is press fitted into an annular wall 88 of the ball retainer 58. Preferably, a washer 89 is concentrically mounted about the piston rod 20 and positioned between the intermediate tube 86 and the ball retainer 58. An annular fluid chamber 90 is formed in the interior volume of the intermediate tube 86 above the intermediate piston 60. Fluid passages 91 are provided in the ball retainer 58 which communicate with the chamber 90.

The lower end of the intermediate tube 86 is press fitted into an annular wall 92 of a rod guide 94 having an annular bearing 96 in contact with the outer circumference of the piston tube 68. Preferably, a washer 98 is concentrically mounted about the piston tube 68 and positioned between the intermediate tube 86 and the rod guide 94. The rod guide 94 is received in an annular seal retainer 100 concentrically mounted about the piston tube 68. A high pressure elastomeric seal assembly 102 is provided between the rod guide 94 and the seal retainer 100. A low pressure elastomeric seal assembly 104 is fitted between the seal retainer 100 and a seal cap 106.

The seal cap 106 includes internal threads 108 which are mated to external threads 110 provided on the outer surface of a body tube 112. The upper end of the body tube 112 is secured to an upper end cap 114. A downwardly projecting annular wall 116 in the upper end cap 114 forms a lower cavity for receiving the ball end 56 and the ball retainer 58. A sealing ring 118 is provided between the annular wall 116 and the ball retainer 58. A sealing ring 120 is fitted in an internal portion of the upper end cap 114 to provide a fluid seal against the ball end 56.

A central bore 122 is provided in the upper end cap 114. A cylindrical valve cap 124 includes a downwardly projecting neck 126 inserted into the central bore 122. A sealing ring 128 provides a fluid seal between the upper end cap 114 and the valve cap 124. A transfer tube 130 is inserted into the neck 126 and projects downwardly through the interior of the piston rod 20 as the piston and rod subassembly 12 is inserted into the body subassembly 16. An annular stop 132 is secured to the outer circumference of the lower end of the transfer tube 130 (FIG. 1B). The stop 132 rests on a sealing ring 133 provided in the interior of the lower end of the piston rod 20. The interior surface of the piston rod 20 and the outer surface of the transfer tube 130 define an annular fluid bypass channel 134. A port 135 is provided near the lower end of the piston rod 20 to provide fluid communication between the upper chamber 69 and the bypass channel 134.

A valving assembly 136 is provided in the valve cap 124 to control hydraulic fluid flow into and out of the actuator 10 as described below. The valving assembly 136 includes an orifice plate 138 having a centralized fluid passage 140 controlled by a blow-off disc valve 142. A helical valve spring 144 is seated at its lower end on the disc valve 142 and at its upper end on a bowl-shaped spring cage 146. The spring cage 146 is trapped between the valve cap 124 and a fluted retaining nut 148 threaded to the upper end cap 114. Fluid passages 149 are provided in the nut 148 for fluid flow described below. An intake disc valve 150 and intake valve spring 152 control fluid flow through intake passages 154 provided radially outbound of the centralized passage 140 in the orifice plate 138.

A tenon 156 having a hollow neck 158 is threaded to the upper end cap 114. A sealing ring 159 is provided between the tenon 156 and the upper end cap 114. A mount assembly schematically illustrated at 160 in FIG. 1A mounts the tenon 156 to a vehicle body 162. A nut 164 is threaded on the upper end of the neck 158 to secure the tenon 156 to the mount assembly 160. An adapter assembly 166 provides fluid communication between the neck 158 to a source of pressurized hydraulic fluid, such as the accumulator 19.

The solenoid valve subassembly 18 is secured to and controls fluid flow through the upper end cap 114 as described below. The solenoid valve subassembly 18 is of conventional design and includes an inner end 168 having a fluid inlet (not illustrated) in communication with an annular fluid passage 170 formed between the transfer tube 130 and the upper end cap 114. Fluid outlets (not illustrated) are provided in an intermediate portion 172 of the valve subassembly 18 and are in communication with an outer annular fluid chamber 174 formed in the upper end cap 114. An internally-contained solenoid element (not illustrated) is activated by electric current supplied through a wire 176 to open and close a fluid path in the solenoid valve subassembly 18. A pair of sealing rings 178, 180 provide fluid seals at the valve subassembly 18. When the subassembly 18 is opened, fluid flows from fluid chamber 170 to fluid chamber 174. When closed, fluid does not travel through the valve subassembly 18. Operation of the valve subassembly 18 can be accomplished with an electric controller or a computer utilized with a suspension system. In other embodiments, the valve subassembly 18 can be continuously variable between closed and fully opened positions.

In operation, fluid travels between an external pressurized accumulator 19 and the actuator 10. The actuator 10 can operate in two modes depending on whether the solenoid valve subassembly 18 is opened or closed. During compression, the piston tube subassembly 14 travels upwardly into the body subassembly 16. When the solenoid valve subassembly 18 is open, fluid from the lower chamber 70 travels through the compression control channel 36 and past the compression intake disk 38 into the upper chamber 69. Fluid passes through port 135 to the bypass channel 134 and the annular fluid chamber 170 in the upper end cap 114. Fluid travels through the valve subassembly 18 to the fluid chamber 174 and then through passages 149 in the fluted retaining nut 148 to reach the accumulator 19 through tenon 158 and the adapter assembly 166.

When the solenoid valve subassembly 18 is closed during compression, fluid travels from the lower chamber 70 through the transfer port 34 to the interior passage in the transfer tube 130. Fluid unseats the blow-off disc valve 142 and returns to the accumulator 19 through the tenon 158 and adapter assembly 166.

During rebound the actuator 10 expands. When the solenoid valve subassembly 18 is open, fluid travels from the upper chamber 69 through the transfer port 135 into the bypass channel 134, past the solenoid valve subassembly 18 and the fluted retaining nut 164 to the accumulator 19. Make-up fluid from the accumulator 19 travels past the intake disc valve 150 and the interior passage of the transfer tube 130 to reach the lower chamber 70 through the transfer port 34.

When the solenoid valve subassembly 18 is closed during rebound, fluid flows from the upper chamber 69 through the rebound control channel 42 and past the deflectable discs 46 to reach the lower chamber 70. Make-up fluid travels from the accumulator 19 to the lower chamber 70 through the transfer tube as described above.

The present actuator 10 includes a fluid-trapping chamber 182 (FIG. 1B) formed between intermediate tube 86 and the body tube 112. Any fluid seeping from the various seals in the actuator 10 is collected in chamber 182. A drain port 184 can accommodate a fluid return line (not illustrated) connected to the accumulator 19 or other fluid reservoir.

When used with a controller, the present actuator 10 provides active suspension of a vehicular body capable of responding to relatively low frequency body motion. Concurrently, relatively high frequency wheel inputs are damped in real time by the solenoid valve subassembly 18.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A hydraulic actuator for use with a pressurized fluid source of a vehicular suspension system, the actuator comprising:
   (a) piston rod means mounting at one end a fluid-controlling piston;
   (b) transfer means concentrically mounted in the piston rod means in fluid communication with the pressurized fluid source;
   (c) valve means for controlling fluid flow between the interior of the transfer means and the pressurized fluid source;
   (d) tube means for reciprocally mounting the piston rod means and piston so that the piston divides the interior of the tube means into first and second chambers;
   (e) bypass channel means providing fluid communication between the pressurized fluid source and the tube means; and
   (f) an end cap, receiving the piston rod means, mounting a solenoid valve assembly for controlling fluid flow in the bypass channel means.

2. The hydraulic actuator specified in claim 1 including an enclosure means to contain the actuator and collect seeping fluid.

3. The hydraulic actuator specified in claim 2 including drain means for removing fluid from the enclosure means.

4. The hydraulic actuator specified in claim 1 including means for mounting the actuator to a vehicular body.

5. The hydraulic actuator specified in claim 1 wherein:
   (a) the piston rod means includes a hollow rod terminating at an end opposite the piston in a ball; and
   (b) a ball retainer is concentrically mounted on the piston rod means to form a ball and socket joint at the intersection of the piston rod means and the tube means.

6. The hydraulic actuator specified in claim 1 wherein the transfer means includes a hollow transfer tube mounted in the piston rod means.

7. A hydraulic actuator for use with a pressurized fluid source of a vehicular suspension system comprising:
   (a) a first piston slidably mounted in a piston tube, dividing the interior volume of the piston tube into upper and lower chambers;
   (b) piston valving means for controlling fluid flow between the upper and lower chambers as the first piston reciprocates;
   (c) a hollow piston rod connected at its lower end to the first piston and terminating at its upper end in a ball;
   (d) a transfer tube concentrically mounted in the piston rod and extending past the ball;
   (e) means for sealing a lower end of the piston tube and mounting the actuator to a wheel assembly;
   (f) a second piston concentrically and slidably mounted about the piston rod and connected to an upper end of the piston tube to seal the upper chamber;
   (g) an intermediate tube slidably mounting the second piston;
   (h) seal means for hydraulically sealing a lower end of the intermediate tube;
   (i) end cap means for closing an upper end of the intermediate tube;
   (j) mounting means for connecting the end cap means to a vehicular body and providing fluid communication between the actuator and the pressurized fluid source;
   (k) valve means for controlling fluid flow between the transfer tube and the pressurized fluid source;
   (l) bypass channel means formed in the end cap means providing fluid communication between the pressurized fluid source and the upper chamber of the piston tube; and
   (m) a solenoid valve assembly mounted on the end cap means for controlling fluid flow in the bypass channel means.

8. The hydraulic actuator specified in claim 7 including an enclosure means to contain the actuator and collect seeping fluid.

9. The hydraulic actuator specified in claim 8 including drain means for removing fluid from the enclosure means.

* * * * *